United States Patent [19]

Allen

[11] 4,323,145
[45] Apr. 6, 1982

[54] VIBRATION DAMPING METHOD AND MEANS HAVING NON-CONTACTING SOUND DAMPING MEANS

[76] Inventor: Clayton H. Allen, 651 Concord Ave., Cambridge, Mass. 02138

[21] Appl. No.: 63,536

[22] Filed: Aug. 3, 1979

Related U.S. Application Data

[63] Continuation-in-part of Ser. No. 738,486, Nov. 3, 1976, abandoned, and Ser. No. 899,223, Apr. 24, 1978, abandoned.

[51] Int. Cl.³ .................... F16F 15/00; G10K 11/02
[52] U.S. Cl. ............................. 188/322.11; 83/169; 83/821; 181/209
[58] Field of Search ................... 83/169, 821, 823; 181/207, 209, 209; 188/1 B, 322.11

[56] References Cited

U.S. PATENT DOCUMENTS

| | | | |
|---|---|---|---|
| 3,497,164 | 2/1970 | Horak | 188/1 B X |
| 3,593,763 | 7/1971 | Neild | 188/1 B X |
| 3,674,065 | 7/1972 | Fairfield et al. | 188/1 B X |

Primary Examiner—Duane A. Reger
Attorney, Agent, or Firm—Charles Hieken

[57] ABSTRACT

A non-contacting damping method and means for reducing vibrations in, and noise radiation from vibrating mechanisms, particularly saws and other mechanical members or materials with acoustically radiating surfaces that may be required to move with a substantially frictionless relation to the damping means is disclosed.

31 Claims, 22 Drawing Figures

VIBRATION DAMPING METHOD AND MEANS HAVING NON-CONTACTING SOUND DAMPING MEANS

REFERENCE TO PRIOR COPENDING APPLICATION

This is a continuation-in-part of application Ser. No. 738,486, filed Nov. 3, 1976, now abandoned, and of Application Ser. No. 899,223, filed Apr. 24, 1978, now abandoned.

BACKGROUND OF INVENTION

The invention described herein relates to method and means for reducing the vibration in various parts of machines and mechanical mechanisms and in the various materials being operated on by such machines or mechanisms.

The present invention has broad application to the reduction of vibration generally, as will be apparent from the following disclosure, but the principles involved in its operation will be illustrated first in its application to the reduction of vibration in a circular saw blade for the primary purpose of reducing the amount of noise radiated, but also for improving the smoothness and accuracy of the cut produced by the blade. Other applications and the various procedures and considerations necessary for adapting the present design concept to such other applications are described.

Circular saws, such as table saws, radial arm saws and skill saws for cutting wood, plastic, or metal vibrate during their operation and create high noise levels that contribute to the permanent heating loss of the operator and other personnel in the vicinity of such operation. This is a problem of worldwide importance.

Federal regulations issued by the U.S. Occupational Safety and Health Administration limiting the noise exposure of industrial workers using such machinery, generally cannot be met by existing noise control methods. A long history of development of devices and means for controlling noise of circular saws shows little advance on the problem.

The steel needed for proper cutting generally has little internal vibrational damping and therefore the impacts between the saw teeth and the workpiece excite the saw blade and cause it to vibrate at high amplitude in its various resonant modes. The greatest excitations are experienced at the blade resonant frequencies that correspond to the cutting impact frequency or particular harmonics of the cutting impact frequency. At these frequencies, energy is readily accepted by the blade from the cutting impacts, and this energy is not readily dissipated by either the internal damping of the blade material nor by the wiping contact between the blade and the work piece and therefore much of the energy received is stored in the blade in the form of a vibratory motion that alternately exchanges the energy from a kinetic energy of lateral motion (perpendicular to the rotary motion in the plane of the saw blade) to a potential energy of bending of the blade from its normal flat, plane configuration. The bending may be made up of various combinations of patterns involving radial and circumferential nodes and antinodes. Some forms of resonant vibration involve vibrations in which the nodes and antinodes do not remain stationary with respect to the blade, but may progress around the blade at various speeds, depending upon the relation between the natural stationary resonant frequency of a particular mode and the frequencies of the driving forces arising primarily from the saw tooth impacts.

Each resonant vibrational mode builds up in amplitude until the rate of dissipation of energy from that mode (which, during each vibratory cycle, involves the loss of a very small fraction of the stored energy) just equals the rate at which energy is supplied by the driving forces. Little energy is dissipated by the internal damping of the blade material itself as is easily demonstrated by impacting the free blade with a small hammer or its equivalent and listening to the sustained ringing of the blade. The sharp character of the blade ringing will generally mellow as the ringing continues because the higher frequencies are more rapidly damped than the lower frequencies even when they all experience the same damping factor (i.e., the same fractional loss of energy per vibrational cycle) and the lower frequencies usually persist the longest.

If the air around the saw blade were removed, the resonant ringing would be sustained even longer because some energy is extracted in the form of sound waves that radiate from the blade surface. This radiated sound from the blade surfaces is the principal cause of excessive noise exposure of the operator and other persons in the vicinity of such a saw. It should be noted that, although the noise radiated is loud and creates a hazardous working environment, the energy drawn from the saw blade by the radiating sound is very small compared with the energy fed to the saw blade by the mechanical interaction between the saw blade and the work piece.

The smallness of the energy radiated by sound can be appreciated when one observes a saw blade freely rotating without contact with the workpiece; at some speeds, simply the interaction of the rotating blade and the air can cause the blade to vibrate so violently as to produce a painful, piercing whine. Thus it is clear that neither the internal damping of the blade and associated solid structure nor the damping of the surrounding air extract energy rapidly enough to limit the vibrational amplitude to a satisfactory value, even when the driving forces are as small as those arising only from turbulent interaction between the blade and surrounding air.

Many attempts have been made to add vibrational damping by changing the saw blade itself. Changes in composition of the blade material help a little, but large changes in damping are not possible with conventional steels. Composite blades have been made using (1) inserts of metals with high internal damping, (2) laminated surface plates on one or both sides of the blade fastened with a viscoelelastic binder, (3) laminating two equal steel blades together, using a similar binder, (4) attaching a viscoelastic outer layer on one or both sides of the blade. All of these have serious drawbacks. Inserts such as, for example, those described in U.S. Pat. No. 2,563,559, Sneva, Aug. 7, 1951, are expensive and, if not securely bonded, they may be dislodged and become hazardous missiles by accidental movement of the workpiece and, if not very intimately bonded to the main blade material, the inserts will be of little effect in extracting energy. Viscoelastic bonding materials tend to be thrown out by centrifugal force from high speed blades. External damping material suffers from this same restriction, but also limits the depth of cut of the saw to that distance that remains between the outer edge of the damping material and the outer tips of the teeth. Whatever portion of the blade extends beyond the damping material will have little coupling to the damping material and therefore may still vibrate with high amplitude and radiate noise.

Means used to contact the side of the blade have produced some damping. A broom handle pressed against a blade, for example, will reduce the noise output of a large blade by damping some vibrations, but this procedure is not very effective because it is highly selective and can couple with only a limited number of vibrational modes, leaving many if not most of the modes undamped and vibrating at large amplitude; some of these modes were present in the undamped blade and some are new ones created by the restraint of the contacting member. The contacting member, in addition to drawing energy from some vibrational modes, also draws energy from the rotation of the saw by its frictional drag and therefore adds to the power required from the driving motor and results in undesirable heating of the blade.

The qualified success of the broom handle type of experiments in effecting some noise reduction and, more particularly, reducing some of the gross vibrations in a saw, has contributed impetus to the design of sawblade stabilizing devices that do not have the frictional drag nor the heating problems produced by a physically contacting stabilizer. Examples of such efforts are disclosed in U.S. Pat. No. 3,540,334, McLauchlan, Nov. 17, 1970, and in U.S. Pat. No. 3,674,065, Fairfield, July 4, 1972. Both of these patents employ relatively small stabilizing presser plates, alternatively called vibration dampers, urged against the saw blade by a suitable force and held away from it by a fluid or combination of fluids allowed to escape at the interface between the plate and the blade from a supply reservoir at a high pressure.

The advantages claimed for the various forms of these devices are primarily increased accuracy of cut, improved smoothness of the cut edges, and reduction of the size of the Kerf or slot cut by the saw through the use of thinner blades, permitted by the reduction of the tendency of thin blades to vibrate when the damping devices are used. In one instance, U.S. Pat. No. 3,674,065, Col 4, line 33, the vibration control improved the accuracy of cut to 0.007 inch with the damper, from 0.050 inch without the damper. In all instances the improvement in performance was in the order of thousandths of inches and applies to the gross vibrations of the saw at low frequencies (related to the blade rotation frequency) which lie in the range of 10 to 100 Hertz (or cycles per second) for blades rotating in the region of 600 to 6000 rpm (revolutions per minute).

Dampers following the teachings of these designs do little in the way of controlling noise (airborne sound) radiated from the sawblade for a number of reasons. First, the dampers are small relative to the surface area of the saw-blade and can therefore couple with and control (or reduce the amplitude of) only a limited number of the numerous high frequency vibrational modes characteristic of the type of movement which radiates sound. Even when a number of dampers are used, as is proposed for some applications, the saw blade is restrained only at a very limited number of points and the remainder of the saw can still vibrate in modes which have little or no active motion at the locations of the dampers so they continue actively to radiate sound when the dampers are applied. Second, the vibrations associated with acoustic noise (airborne sound radiation) have very much smaller amplitudes than those for which the vibration dampers of the prior art are designed to control. The acoustic freqencies of interest lie generally in the region of 500 to 10,000 Hertz. Third, the damper designs illustrated by the prior art teach the use of a recessed plenum of a minimum of 0.001 in. to aid the distribution of the fluid used as the bearing medium between the saw and the damper. Any space used as a plenum reduces the effectiveness of the damper for converting vibrational energy into air flow which in turn is used to convert that energy into heat. Fourth, the edge of each damper is constructed as a narrow rim around the recessed plenum which follows the convention generally used for the design of fluid bearings; however, that design does not work well toward converting vibrational energy into heat. It tends to restrict the flow of air across the rim and confine the air in the recessed plenum where it is simply compressed as a spring and is then effective in pushing the saw blade away after the compression. The air thereby returns most of the energy of compression back to the saw. At acoustic frequencies the net effect is only to have decreased the amplitude of the saw blade by alterning its vibrational wave shape a miniscule amount as a result of the increased pressure against it as it progressed toward the damper. To obtain any substantial decrease in the vibration at acoustic frequencies, means must be provided for taking energy from the air before that energy can be returned to the saw during the next half cycle. None of the designs of prior art teach how to withdraw or to absorb energy from the air.

Vibrations of the saw blade in the acoustic frequency range of primary interest, 500 to 10,000 Hertz, are excited (or receive their energy) primarily from the tooth impacts rather than from the irregularities in the blade rotation. The acoustic frequencies that do most of the radiation are those frequencies characteristic of the tooth impact frequency or any of its harmonics that lie at or near any of the numerous natural resonant frequencies of the saw blade. The small amplitude of these vibrations can be appreciated by considering the situation for a 10 inch diameter wood-cutting circular saw for which the sound pressure measured close to a blade sawing a ¾ inch pine board was in the order of 130 dB re 0.0002 microbar (millionths of an atmosphere).

Most of this sound energy was at 1000 Hz and above. The displacement amplitude of the saw blade necessary to generate this pressure, if all the energy were concentrated at 1000 Hz, would be under 0.001 inch; if the energy were distributed to higher frequency components the amplitude would be lower since the amplitude required to create a given pressure varies as 1/frequency.

The objective of the present invention is to reduce the radiated noise at the operator's position (approximately 2 ft. from the saw blade) to meet the requirements of the Occupational Safety and Health Administration or surpass them. That agency now requires the sound level to be below 90 dBA where personnel are exposed for periods of 8 hours daily and that requirement may be lowered to 85 dB in the foreseeable future.

Conventional noise reducing means have relied upon extracting vibrational energy at acoustic frequencies from the blade by employing the high internal losses in selected materials that undergo extensional or shearing deformation, and designing arrangements of such materials so as to optimize their deformation as a saw blade vibrates. This seems to be the most obvious approach because the application of damping materials is known to be highly effective on panels and other relatively thin vibrating members which in themselves have little internal damping. The difficulties previously mentioned notwithstanding, much effort has been expended in improving this means of energy extraction.

It is not obvious that the very much less effective process of extracting energy by acoustic means from the side of the blade without making any physical, solid contact to the blade could be made even more effective than the process of damping by adhesion of solid damping materials to the blade. However, a number of substantial advantages to such a process has encouraged its exploitation and the results have led to the extremely effective and beneficial noise control means set forth in this disclosure.

The advantages sought and achieved include:
(1) A high degree of reduction of radiated noise over the broad audible frequency region;
(2) Freedom to utilize the full cutting depth normally available with an untreated saw blade;
(3) Freedom to use any conventional saw blade with smooth sides;
(4) Freedom to interchange sawblades at will as the workload may demand;
(5) Avoidance of costly modifications or additions to conventional saw blades;
(6) Increased life of saw blade due to reduced fatigue from vibration;
(7) No need for decreasing saw blade strength or increasing its thickness as is necessary for some configurations using solid damping means;
(8) Automatic application of damping when the saw is in use and withdrawal of the damping means for ease of access to the saw when the saw is deactivated;
(9) Simultaneous stabilization of low frequency vibrations characteristically produced by rotational irregularities thereby to provide for more accurate cutting, for better surface finish, and for the use of thinner blades where thicker blades would have been required without the benefit of such stabilization.

SUMMARY OF THE INVENTION

The present invention, in contrast to the method and means of prior art, extracts energy from the lateral motion of the sawblades similar in a way to the broom handle means, but without any frictional drag. Whereas conventional vibrational damping means have attempted to extract vibrational energy by enhancing the internal damping of the solid structure of the blade or its support, the present invention is directed toward enhancing the radiation of energy from the sides of the blade by a better coupling to the surrounding air medium without making any physical connection with the blade except through the air itself. In this way a strong coupling is achieved between the damping means and the vibrational motion of the saw blade and a substantially complete decoupling is achieved between the damping means and the circular motion of the saw blade.

By supporting the damping means from the stationary base of the saw and not on the saw blade itself, the damping means can be located away from the cutting region so as to interact with the large portion of the sawblade that is free from the material being worked. In this way the damping means can couple directly and simultaneously with substantially all of the vibrational modes of the saw even those that may travel around the periphery of the saw blade and those that extend out into regions of the saw which, as the saw turns, may actually be submerged into the slot being cut in the workpiece. This advantage accrues because substantially all modes of resonant vibration are symmetrical, and therefore vibrations that occur at the part of the saw which is inaccessible because it is within the slot being cut, will also be present in one or more of its symmetrical replicas at other parts of the blade. The simplest mode of vibration of the saw has a fixed region at the hub, and the rim as a whole moves laterally back and forth across its neutral plane. Obviously this mode can couple to a damper located anywhere around the saw but will couple best near its rim just inside the root of the teeth. A second mode involves a similar vibration having half of the rim moving in the opposite direction from the rest. If that mode rotates with the saw it can likewise be coupled to a damper located anywhere. However, if a vibrational mode involves a bending of the saw along a radial line in a way similar to the second bending mode of a beam clamped at one end, there will be a nodal region along a circle at some particular radius from the center on the face of the saw for which the amplitude of motion vanishes. A narrow damper placed anywhere along this circular region would be very ineffective in extracting energy and that mode would continue substantially undamped whether the damper were applied or not. At higher frequencies many such nodal regions exist, but always they are substantially symmetrical and every mode can be coupled to an external damper in close proximity to the saw provided that the damper extend over a substantial portion of the saw blade area so as not to leave uncovered all of the highly vibrating areas of any significant mode or modes of vibration. This means that a large portion of the saw blade must be covered; about $\frac{1}{4}$ and $\frac{1}{2}$ of the radiating area on either or both sides of the blade should be covered for maximum effectiveness of the dampers. Smaller areas of coverage will result in less effective damping, but where, for some reason, obstacles preclude covering more area, a useful amount of damping can be secured with as little as 1/10 of the area covered if it is well distributed between the hub and the rim. In all cases, all the blade area usually available for the cutting operation will remain available for this primary function when dampers of the design described here are employed.

BRIEF DESCRIPTION OF DRAWINGS

FIG. 21 shows a partially cut away embodiment of the damper employing viscoelastic damping means.

FIG. 22 shows yet another preferred embodiment of the damper employing internal fluid damping means.

DETAILED DESCRIPTION OF PREFERRED EMBODIMENTS

Figure 1:
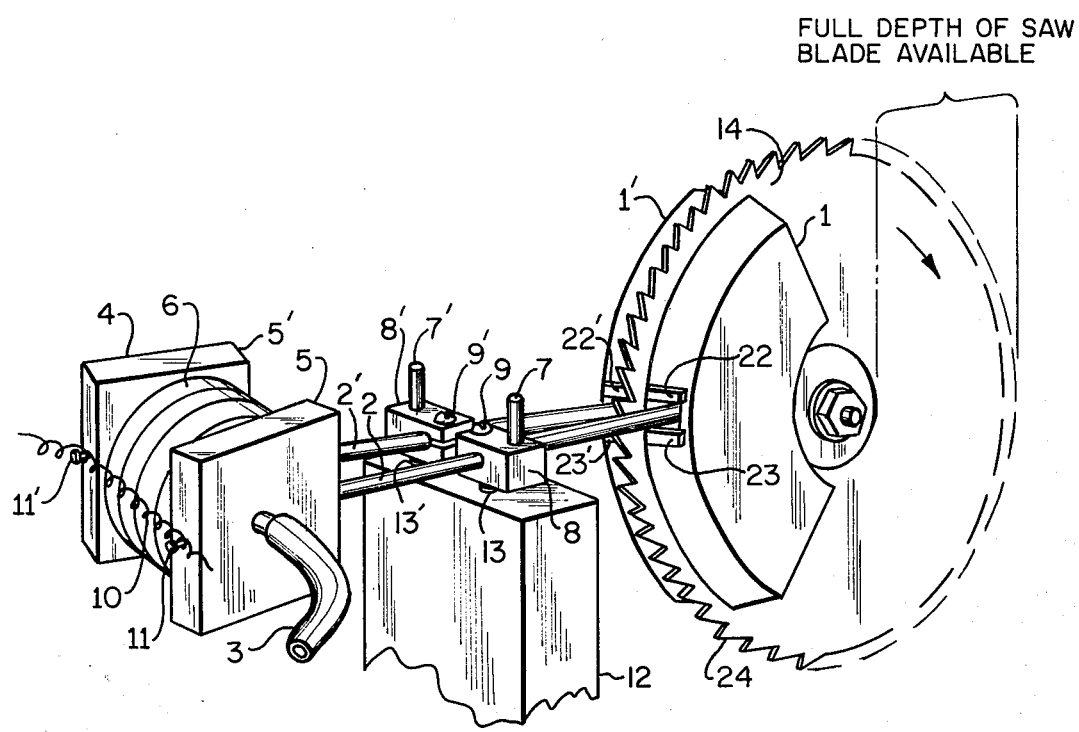
FIG. 1 shows a perspective view of the experimental model of the invention as applied to a circular saw.

FIG. 1 shows the experimental, pneumatically operated, acoustic vibration damper applied to a wood cutting circular saw. The same type of damper could be adapted to any kind of circular saw, band saw, or the like and to any material that might vibrate excessively when being cut by a saw, milling machine, grinder, planer, or shaper. The damper assembly in operation may advantageously consist of two dampers, 1 and 1', each covering ¼ to ½ of the sound radiating area of one side of the saw blade and being positioned so as to act on opposite sides of the blade 14 so that any thrust against the blade from one damper will be counterbalanced by the other, thereby to permit the saw to rotate freely, maintain its neutral operating plane, and perform accurate cutting operations.

Figure 2:
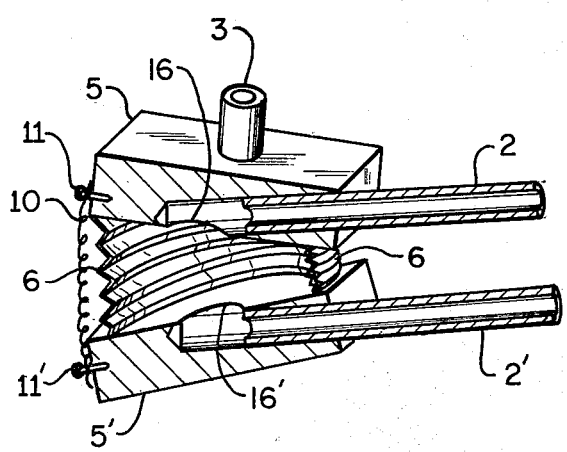
FIG. 2 shows a partially cut away perspective view of the pneumatically operated bellows used in the experimental model damping device acting against a saw blade.

Said dampers are carried by supporting tube 2 or 2' connecting to a pressurized air supply which, in this embodiment, consists of a vaccum cleaner exhaust (not shown) fed through a flexible tube 3 to a bellows arrangement indicated generally as 4 comprising two end plates 5 and 5' and a section of flexible, 4 in. diameter duct 6 cemented to said end plates to form an expandable pressure chamber urging the end plates apart. Said end plates in turn urge apart the two supporting tubes 2 and 2' with which they are rigidly connected and to which they each provide a passage 16 and 16' shown in FIG. 2 for supplying pressurized air to dampers 1 and 1'. The supporting tubes pivot about vertical bearing rods 7 and 7' by means of bearing members 8 and 8' clamped to the support rods 2 and 2' by means of clamping screws 9 and 9' which can be tightened when the support tubes have been positioned so that the moment created by the bellows assembly is slightly less than the moment created by the air bearing pressure between the dampers and the saw when the dampers are less than one thousandth of an inch away. A light spring 10 is stretched between the two pins 11 and 11' in end plates 5 and 5' to provide for the closing of the bellows and retraction of the dampers away from the saw blade surface when the air supply pressure drops below a safe operating value. Said bearing rods 7 and 7' are supported and located by a support block 12 fastened to the stationary base of the saw mechanism not shown. The bearing members 8 and 8' rest on washers 13 and 13' to minimize turning friction.

Figure 3:
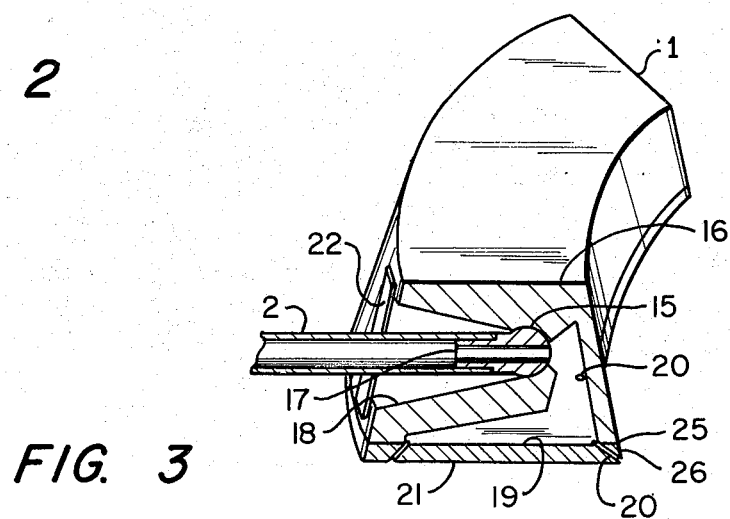
FIG. 3 is a partially cut away perspective view of one of the experimental models of the damper.

Each damper is mounted on a ball-and-socket connection 15 that can be observed in FIG. 3 which shows a cross section of one of two identical dampers 2. Said socket, an integral part of the back cover 16, provides for a small amount of rotation of said damper about the ball 17 on the end of said support rod 2, clearance for that motion being provided by the conical recess 18. The rotation is utilized to provide freedom for the damper to rest evenly against the saw blade on the air bearing supporting film provided by the pressurized air escaping through the rigid porous facing member 19 and through fine holes 20 located around the periphery of the flat bearing surface of the porous facing membber 19 to provide additional air flow for improved supporting stability. Movement of the damper in the direction around an axis normal to the saw blade is restricted by bars 22 and 22', 23 and 23', so that the damper will not inadvertently rotate about that axis to such an extent that an edge of the damper would engage the teeth 24 of the saw and cause damage to the damper or the teeth or both. The porous facing member 19 is fastened to the backing member 16 by suitable cement at 25 and the edges 26 of said porous facing are sealed to prevent leakage and waste of the pressurized air.

Figure 4:
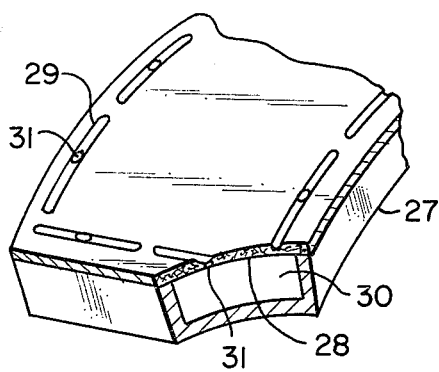
FIG. 4 is a partially cut away perspective view of another preferred form of the damper.

FIG. 4 shows another preferred embodiment of the damper in which the back cover 27 is shallower than that of the earlier design. The porous facing material 28 in this design is provided with a plurality of narrow recesses or grooves 29 around the periphery of the flat bearing surface to distribute the pressurized air flowing from the pressurized chamber 30 through fine holes 31; the recesses spread out the air from each fine hole and allow the air to lift the damper without suffering from the restriction of flow and the loss of lift in the region close to the hole that occurs when the hole opens directly at the flat surface of the plate. In this embodiment the edge of the porous material is also bonded to the back cover and is sealed against leakage.

Figure 5:
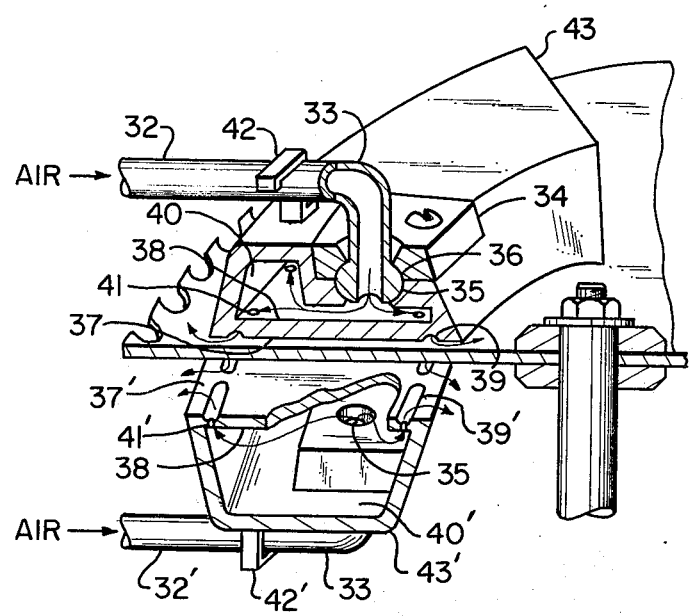
FIG. 5 is a partially cut away perspective review of another preferred embodiment of the damper in operating relation with a saw rotating in a horizontal plane.

FIG. 5 shows another preferred damper assembly in which the support tubes 32 and 32' enter the back of the damper and have an elbow 33 and 33' so as to bring the two tubes to a common supporting member (not shown) on which they can be pivoted in a manner similar to that illustrated in FIG. 1. This design has a removable cap 34 that captures the ball 35 on the end of support tube 33 by completing the socket 36 and permits removal of said ball if necessary. In this design the flat face 37 or 37' serving as the bearing surface is not porous but is a rigid, solid member 38 or 38', with a plurality of narrow recesses or grooves 39 or 39', around the periphery of the flat face, each groove being fed pressurized air from the chamber 40 or 40' of each damper through a fine hole 41 or 41' between said chamber and each of said grooves. Brackets 42 and 42' serve to prevent excessive movement of the dampers 43 and 43' around the ball 35 or 35'.

Figure 6:
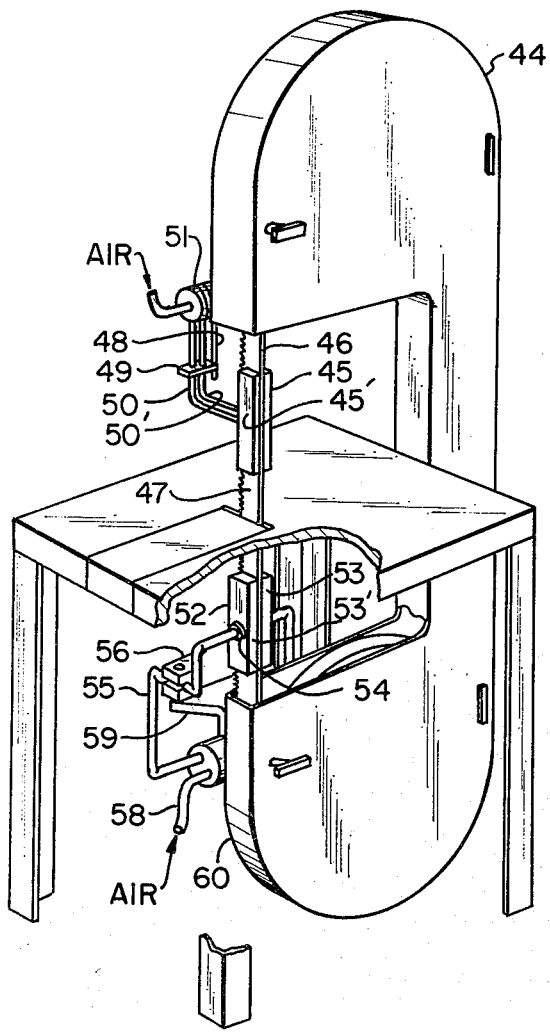
FIG. 6 illustrates an adaptation of the damper to a band saw.

FIG. 6 shows an embodiment of the present invention applied to a band saw 44 in which two dampers 45 and 45', having cross sections similar to those of dampers illustrated in FIG. 1, 3, 4 or 5, but shaped to have a narrow elongated footprint covering the smooth, flat surface of the saw blade 46, not covering the teeth, and located above the cutting region 47 of the blade and supported and located by the fixed part of the upper protective covering for the saw blade or from the frame work of such covering by adjustable support member 48 and pivotable clamps 49 for support tubes 50 connecting the dampers 45 and 45' to the bellows 51 that supplies air for the air bearing support between blade 46 and the dampers 45 and 45' and provides the clamping force that urges said dampers against said blade. Similar damping means may be located below the cutting region 47 as indicated by the assembly designated generally as 52 comprising dampers 53, ball and socket joints 54, support tubes 55, pivoting bearings 56, bellows 57, air supply tube 58 and adjustable mount 59 attached to the lower, fixed protective cover 60 of the saw or its framework (not indicated). The elongated damper is designed to cover a length of blade sufficient to include a number of wave lengths of bending waves in the blade at frequencies that are responsible for significant noise radiation.

Figure 7:
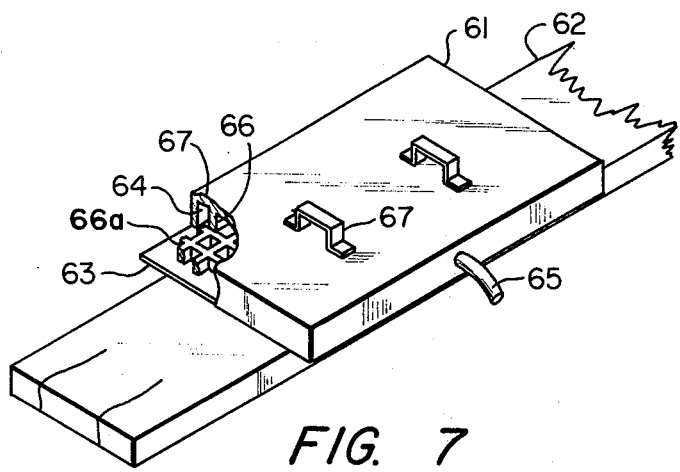
FIG. 7 shows another modification of the damper as applied to the quieting of a board that may tend to radiate unwanted noise while being sawed, planed or shaped by machines not shown.

FIG. 7 shows a modified damper 61 that may be much enlarged from those applied to circular saws so that it may cover a large area of a work piece 62 such as a board or plank being sawed, planed, shaped or otherwise excited into unwanted vibration. The damper 61 employs a flat, rigid, porous, bearing plate 63 facing said work piece. Pressurized air is provided to flow through the plate 63 from chamber 64 and supplied from a low pressure source such as the exhaust of a vacuum cleaner or a conventional blower (not shown) through a suitably flexible tube 65. Since the dimensions of this damper may be larger than those for which the stiffness of the porous bearing plate can support the damper and remain substantially flat and vibration free, a stiffening grid work 66a is provided inside the chamber 64 and bonded to the plate 63. Additional support may be provided to the gridwork by posts or ribs 66 depending from the back cover 67 and pressing against or fastened to the gridwork 66a to make an integral rigid network for maximum stability. Handles 67 may be provided for ease of using said damper. This type of damper can be made flexible so as to conform to a workpiece. It can also be incorporated into a table supporting the workpiece.

Figure 8:
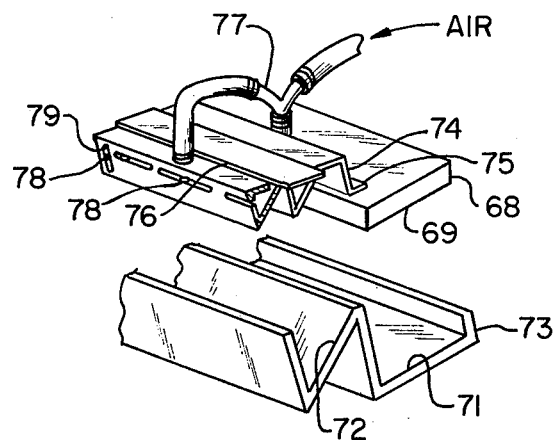
FIG. 8 shows another modification of the damper adapted to quieting an extruded metal strip that may have unusual shape and require noise and vibration control while being sawed, milled, or shaped by other machines not shown.

FIG. 8 shows a modification of the invention referred to generally as 68 comprising one or a plurality of dampers such as 69 and 70 shaped as elongated members to fit into slots 71 or grooves 72 or other shapes of a workpiece that may consist of extruded aluminum, steel, or the like, illustrated here as an integral piece 73 that may be excited into unwanted vibration by sawing, milling, filing, or other mechanical operations. The two damping members 69 and 70 as illustrated may be fastened together by a flexible strip 74 of suitable material such as leather, plastic, rubber, etc., fastened securely to both members as along the edges indicated by 75 and 76. Air is supplied to hollow cavities within the dampers through a suitable tube assembly 77, that may be used also as a handle for moving the dampers and applying them to said workpiece. Air escaping through openings 78 in the dampers support the dampers on air bearings as herebefore described.

The dampers such as 69 and 70 may be conveniently formed for irregular or complicated extrusions such as 73 by casting against a portion of said extrusion, a plastic that will set up to form a dense rigid member that can be subsequently trimmed and machined to provide air distribution grooves 79 or the equivalent thereof and holes such as 78 to an internal pressurized cavity of suitable, convenient shape, machined into the casting and fitted with a suitable closing cover and air supply tube.

Figure 9:
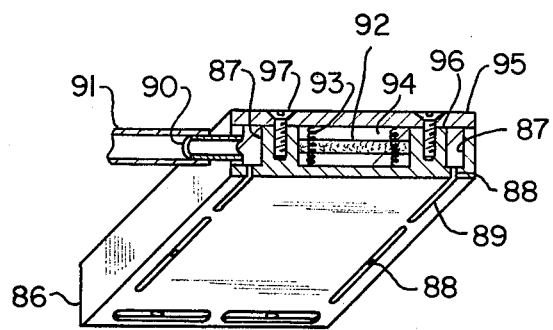
FIG. 9 is a partially cut away view of another form of damper enclosing a porous seismic mass suspended on springs and encapsulated in oil.

FIG. 9 shows an alternative form of damper 86, preferred for some applications particularly where foreign material might tend to clog a porous facing. Said damper comprises a solid block of rigid dense material that may be metal or impregnated plastic that has two cavities one cavity 87, used in the manner already described as an air bearing manifold, goes continuously around the periphery of the damper to supply air through a plurality of fine holes to similar plurality of narrow recesses 89 around the perimeter of the damper. The air cavity is supplied from an external pressure source through tubes 90 and 91. In addition to said air cavity there is a second cavity 94 containing a dense block of porous material such as fiber metal 92 or the like resiliently mounted on springs such as 93 or elastomeric material well known for vibration isolation, and the cavity 94 is filled completely with liquid or other fluid of suitable viscosity and sealed by a cover 95 with a gasket 96 held in place by screws 97 or other suitable sealing means. The porous block 92 acts as a seismic mass tending to remain stationary as the damper 86 is moved under the influence of vibratory forces from the vibrating member against which it is pressed; the relative motion between the damper and the porous block forces fluid to circulate back and forth through the porous block causing a dissipation of vibratory energy as heat.

Figure 10:
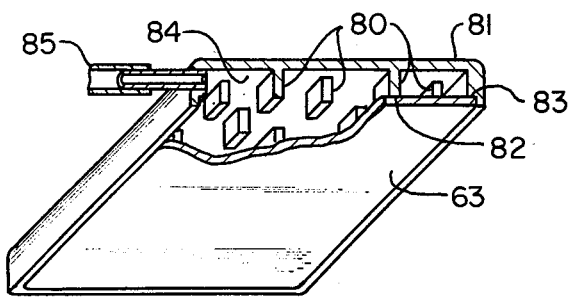
FIG. 10 is a partially cut away perspective of the damper of FIG. 7 shown from below.

FIG. 10 shows a cutaway, underside, perspective view of an alternative form of the damper 61 of FIG. 7 in which the support for the porous facing 63 which may be fiberous metal or equivalent, is provided by a plurality of projections 80 from the inside of the top cover 81 to which the porous material may be suitably cemented or otherwise securely bonded as at 82 and 83 to minimize vibration of the damping structure. Air supplied to the chamber 84 through the flexible tube 85 escapes through the porous material 63 to form an air bearing support against the workpiece as before described.

Figure 11:
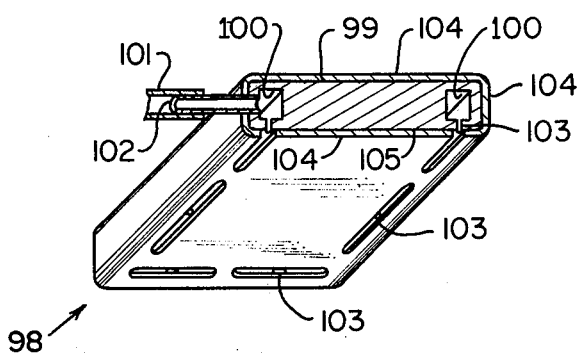
FIG. 11 is a partially cut away view of a damper member such as intended for damping extruded metal strips as in FIG. 8.

FIG. 11 shows a further modification of the present invention in which the damper 98 comprises a block 99 with a cavity 100 for delivering air from the supply tubes 101 and 102 to a plurality of small holes 103 in the bearing face of the damper. Said damper is covered with a layer of soft, resilient material 104 to be used to press against a vibrating extrusion of aluminum or plastic or the like such as 73 in FIG. 8 without causing scratches, dents or other imperfections in the surface finish of such materials. The resilient covering material 104 may be leather, chamois, rubber or suitably dense foam material which will be durable and serve in combination with the air supply to form a suitable air bearing, said covering material may be either porous or non-porous depending upon the application. If it is substantially non-porous it is to be provided with a plurality of narrow slits around the periphery of the bearing surface to distribute air from the air outlet holes 103. The covering material such as leather, rubber-like compounds, soft plastic, etc. with internal damping will absorb vibratory energy and convert it to heat as deformation takes place either by shearing or compressing as the pressure in the air film between it and the workpiece or other member being damped changes under the effect of vibration of the adjacent surface.

For very uniform surfaces, where close dimensional tolerances and fine finish admit a thin air space between the damper 98 and a workpiece such as 73 of FIG. 8, use may be made of a harder covering material like teflon or nylon which may undergo little or no deformation and thereby rely upon the air movement in the narrow gap between said damper and said workpiece 73 to provide the conversion of vibrational energy to heat as herebefore explained.

For a very nonuniform workpiece surface where translational movement is not required, a comparatively thick, soft, and porous, but durable cover material like a dense nylon felt or a compressed polyurethane foam may be most serviceable and perform favorably by expanding to fill the gap between the solid surface 105 of the damper and the solid, rough or irregular surface of the workpiece such as illustrated by the board of FIG. 7. In this instance vibration of the workpiece causes air to flow through the porous cover in various directions and thereby converts vibratory energy into heat. As the covering material is made thicker and softer less energy can be absorbed at its maximum level of performance, but the damper will still be effective at a much larger spacing or separation between the damper and the workpiece than would occur with a damper having a harder facing.

Figure 12:
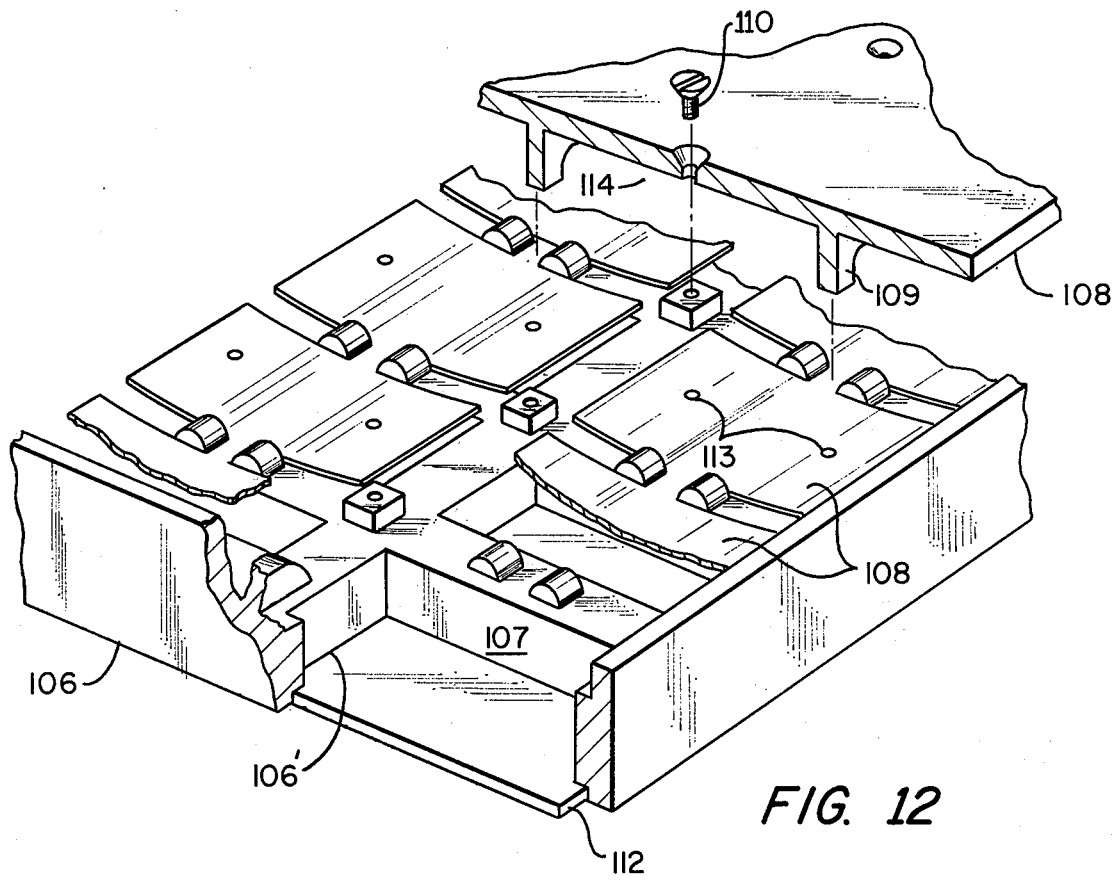
FIG. 12 is a partially disassembled, fractional, sectional, perspective view of a damper for use in damping irregular surfaces.

FIG. 12 shows a modification of the internal cavity of a damper, designated in its entirety as 106, that is intended to be employed to reduce the vibration in boards or other materials of variable or random widths being fed to machines otherwise undergoing operations that cause unwanted vibration. Such a damper may at times be employed with only a small portion of its area actually adjacent to the workpiece being quieted and a significant loss of air would occur through the overhanging porous facing as shown at 63 in FIG. 7. To minimize such loss of air and to maintain a satisfactory working pressure in the cavity or plenum of the damper, the modification illustrated in FIG. 12 contains, in conjunction with a stiffening grid 107 that is bonded to the porous facing 110 along all edges 106 of the grid, a plurality of reeds or spring plates 108 of thin metal or plastic or the like, some or all of which may be stamped and retained as a single sheet of material and placed in the damper and held in place by a suitable cover plate 108 designed with depending clamping columns 109 and held in place by screws 110 or other conventional fastening means. The spring plates 108 are curved upward so that air may pass freely between their edges and the top 111 of the stiffening grid when the porous bearing face 112 lies over or adjacent to the workpiece to be damped, but when the porous face overhangs the workpiece, so much air is allowed to escape that the pressure in each single grid cell so exposed drops and the air pressure above the spring plate forces the spring down so as to seal against the top of the grid and cut off the air flow to that cell. If the damper is shifted relative to the workpiece so that a cell that has been so closed off is now covered by the workpiece, air will not escape so readily form it through the porous facing and the small flow of air from the plenum 114 above the springs through the small holes 113, provided in each spring plate for that purpose, will increase the pressure in the closed cell and allow the spring member to lift thereby reactivating that cell area as part of the supporting area of the static air bearing between the damper and the workpiece. Other means of valving could be used.

Figure 13:
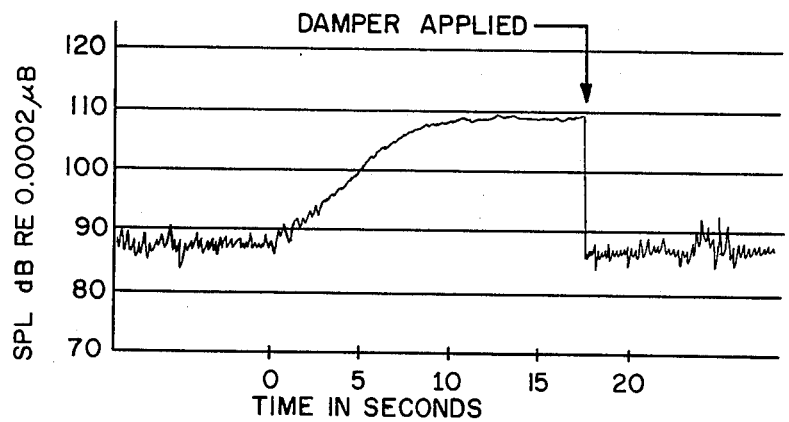
FIGS. 13–15 are graphic level records showing performance of the experimental damper applied to a circular saw.

FIG. 13 is a graphic level record of the sound level measured by a microphone placed ¾ inch from a free-running 10-inch sawblade surface, 1 inch in from the tips of the teeth. It shows a gradual build-up of a pure tone resonance of the blade between 2000 and 4000 Hz, over a period of approximately 15 seconds at which time the sound level had risen from under 90 dB to 110 dB, re 0.0002 microbar, simply by the action of air turbulence; at that time the dampers as illustrated in FIG. 1 were activated and the level immediately dropped over 20 dB back to a level under 90 dB. The extent of the reduction of the pure tone could not be evaluated because of the presence of background noise at other frequencies. The puretone whine simply disappeared as far as audibility is concerned. A similar measurement made with a 2000 Hz octave band filter indicated a drop of 24 dB. More of a drop would have been observed with a narrow band filter tuned to the resonance frequency.

The most important aspect of the present invention is not so much its control of a pure tone resonant vibration (though that is important), but its control of the much more tenacious, broad band noise radiated from the driven vibrations. Several types of saw blades were tested with and without the saw damper while sawing. The most noisy was a relatively dull saw with 100 teeth designed for cutting plywood. Continuous ¾ in. deep rip. cuts made with this saw blade in a 1-in. maple board produced a level in the reverberant field of the test room generally ranging between 100 and 105 dB re 0.0002 microbar undamped and approximately 90 dB when dampers, such as illustrated in FIGS. 1 and 3, were activated with air at a pressure of ½ psig. The dampers were then coated with wax and polished to give a smooth, flat non-porous surface, but the small air holes around the perimeter were retained open to supply air for lifting the damper surface free from the blade at a distance of the order of 0.001 inch. A magnetic tape recording of a saw cut lengthwise into the same maple board showed similar noise reduction 10 to 15 dB from a level of roughly 103 to a level of roughly 90 dB. A graphic level record of this recording was made by passing the recorded signal through a sound level meter and an octave band analyzer.

Figure 14:
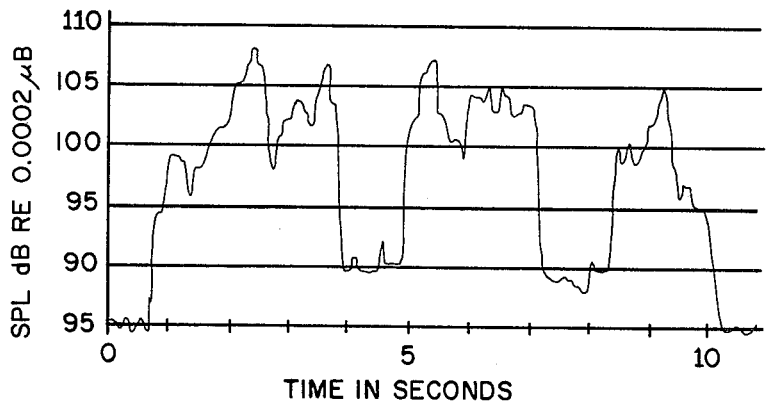

FIG. 14 shows a graphic level record of the overall noise level measured in the reverberant part of the test room, 10 ft. from a radial arm saw. making a continuous rip cut ¾ inch deep into a 1-inch thick maple board using a 10 inch saw blade with 100 teeth turning at a rated speed of 3450 rpm driven by a ¾ hp motor; the high level portions indicate the level measured for the undamped saw blade; the lower level portions indicate noise level measured when the dampers shown in FIG. 1 were activated. The decrease in level is 10 to 12 dB. Interestingly, our measurements showed nearly the same sound level each time the dampers were activated regardless of the level existing for the undamped saw at the time the dampers were activated. This indicates that the maximum amount of noise reducing capability has not yet been observed and that a search should be made for increasingly noisy undamped saw operations until some are found that are noisy enough to give a relatively consistent amount of noise reduction from the undamped to the damped condition for various levels of undamped noise.

Figure 15:
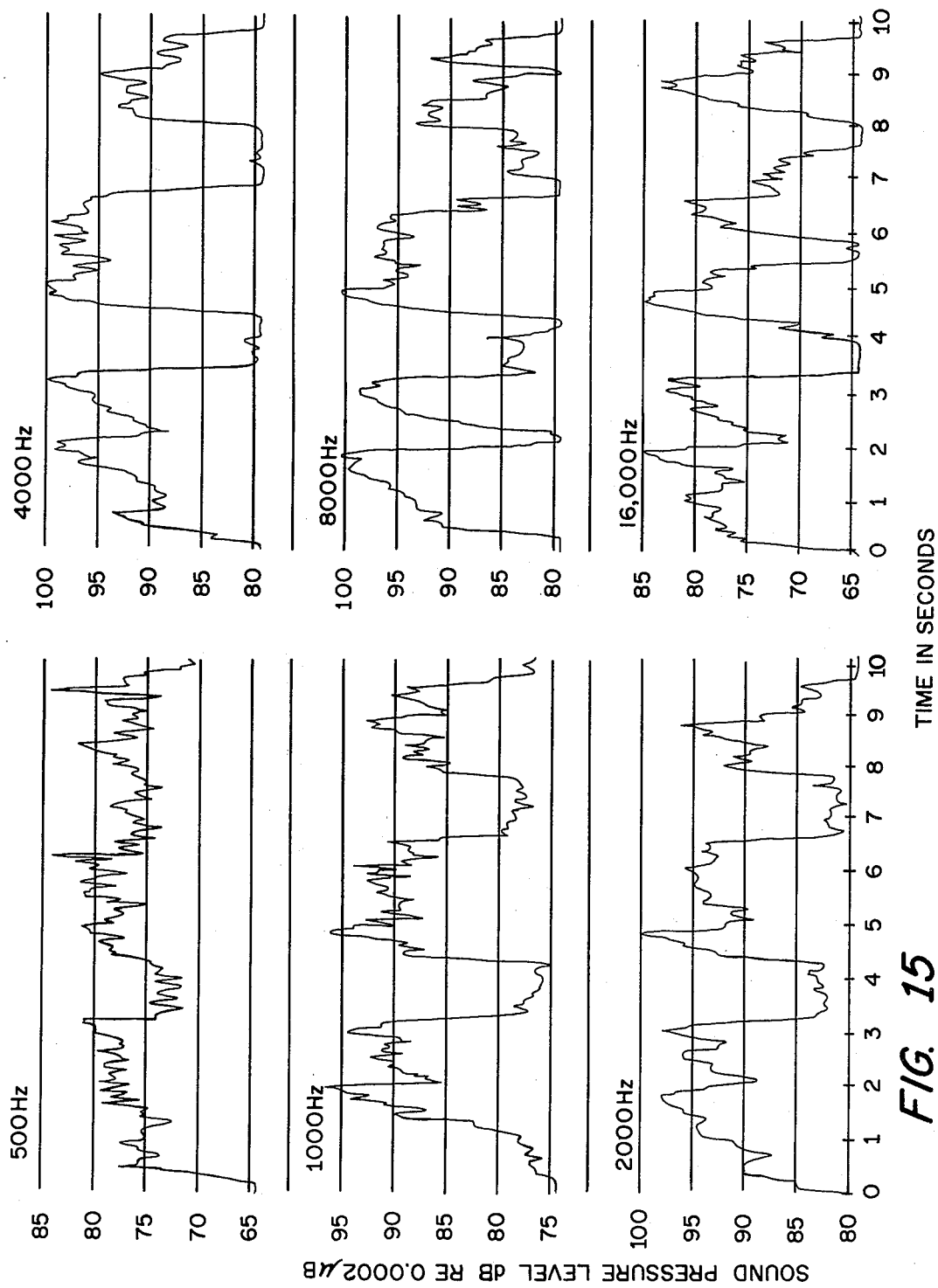

FIG. 15 which presents graphic level traces obtained when the overall signal illustrated in FIG. 14 is passed successively through octave band filters centered on the 500, 1000, 2000, 4000, 8000, 16,000 Hertz octave bands. There is little troublesome noise in the 500 Hz band and there is also little if any noise reduction in this band.

The most troublesome noise is in the 1000 to 8000 octave band regions and in these octaves the noise levels are seen to be reduced by the order of 10 dB or more when the dampers are applied. There is much less noise in the 16,000 Hertz band and it is of little interest as regards a hearing hazard.

As already stated, the amount of energy extracted by acoustic radiation of sound from the sides of a saw blade is small compared with the energy stored in the vibrating blade and it is generally small compared with the total of the energy dissipated by internal damping of the saw blade and by frictional damping at the hub between the clamping collars even for the most resonant of assemblies. That is the reason that historically the greatest effort has been expended in attempts to reduce noise radiation from saws through improvement of the solid damping mechanisms rather than by enhancement of the mechanism of energy transmission to or through the air to an external means of energy dissipation.

From a consideration of the acoustic parameters controlling the sound radiation it is clear why so little energy is extracted from a saw blade by sound radiation. Sound pressure levels measured near a 10 inch diameter wood saw blade, for example, may run as high as 130 dB re 0.0002 microbar during a cutting operation or during an idling operation at high speed where a single resonance frequency may be highly excited simply by interaction with the air. The smallness of the air excitation and the high ratio of the stored energy to the amount of energy gained in each cycle is easily appreciated from the fact that the air excited vibration may have a frequency of 2000 Hertz (or cycles per second) and require as much as 10 seconds or 20,000 cycles to build up to full amplitude as illustrated by the experimental data presented in FIG. 13.

Since the saw blade bends or ripples somewhat like the motion of a flag in a breeze, some parts of the saw are moving in opposition to others in regard to the plane of the blade. Therefore the blade never radiates sound as well as it would if it were vibrating all in the same direction at any instant of time. It is difficult to estimate the decrease in radiation due to this effect because it will change from one modal configuration to another and therefore depends upon the way in which the blade may be excited at any particular time. It is possible to estimate an upper limit for the sound radiation which would be that for the condition in which the whole saw blade vibrated as a unit (all in phase) from one side to the other across its neutral or rest position. For this case there is still some inefficiency because air being pushed by the blade can spill around its edge resulting in a circulation of air that does not contribute to sound energy radiation nor dissipate much energy in its own motion. Neglecting this inefficiency and considering that the surface of the blade radiates energy as if it were a portion of a much larger member (no spilling) moving at the same amplitude we can estimate its maximum energy radiation capability by employing the relation that the sound power w radiated per unit area is equal to the square of the sound pressure p generated by the saw in the air divided by the characteristic acoustic impedance of air. The sound power is simply the amount of energy drawn from the blade and converted into sound in each second of time. The characteristic impedance of air is simply the product of the velocity of sound c and the density of air $\rho$.

$$w = (p^2/\rho c)$$

The maximum total sound power W that could be radiated by the saw would then be the value of the power per unit area w, multiplied by the area ($2\pi r^2$) of both sides of the blade.

$$W = (p^2 2\pi r^2)/(\rho c)$$

For a 10 inch diameter saw (neglecting cutouts at the teeth) that is creating a sound pressure level of 130 dB re 0.0002 microbar, the total maximum sound power radiated under the above simplified assumptions would be approximately 1 watt. Because of the radiational inefficiencies, the actual sound radiation will be much lower probably 0.1 watt or less. Actual measurements for a 10 inch saw cutting a $\frac{3}{4}''$ groove in a 1 inch thick maple plank showed average sound power radiation to be approximately 0.05 watt with peaks rising to 0.3 watts during a sustained ripping operation using a saw blade with 100 teeth and pushing the board at near capacity for the $\frac{3}{4}$ hp motor at 3450 rpm. Since such a saw may normally be driven by a $\frac{3}{4}$- or a 1-horse power motor (600 to 800 watts) is is clear that the sound radiation carries away only an insignificant fraction of the power being supplied to the blade. Of course most of the driving power from the motor goes into cutting the material being sawed, but even if only 1% of the driving power is converted into vibration of the saw it is clear that 10 to 100 times as much power may be converted into vibration as will be extracted as sound under ordinary conditions.

The way to radiate more energy from the blades is to increase the characteristic impedance into which the saw blade must radiate. This could be done by increasing the density of the air, but that is unreasonable. However, it is feasible to place a porous material near the blade surface such that the movement of the blade causes air to flow back and forth through the porous material in such a way that the viscous drag experienced by the air in its motion within the narrow passages in the porous structure requires more work than would be necessary if the porous material were not there. The work done in this process results in a conversion of motional energy into heat within the porous structure and thereby removes energy from the vibrating blade.

By making the porous material more and more dense (i.e., less porous) so that greater pressures will be required for a given air flow through it, a greater and greater load can be placed upon the vibratory motion of the blade without even touching the blade. The flow resistance of the porous material measured in rayls (which is the value of the pressure p, in microbars, exerted by the air against the material, divided by the velocity of the air through the porous material measured in cubic centimeters per second through an area of one square centimeter) has the same dimensions as the characteristic impedance of air which is near 40 rayls at room temperature and normal atmospheric pressure. If the porous material is made to have a flow resistance of 4000 rayls (i.e., 100 times the characteristic impedance of air) and if it is placed close to, but not touching the saw blade, it acts as an increased acoustic radiation impedance and if a negligible amount of air squeezes out and in around the edges, the saw will dissipate approximately 100 times as much energy per square centimeter into the porous material as it would into open air at maximum efficiency. This increased rate of energy extraction (of the order 1000 times more than actually radiated to the air because of the inefficiencies already described) adds significantly to the saw damping.

Clearly, with this much higher energy extraction per unit area it is not necessary to cover the entire saw blade to secure the required damping. Covering a small portion of the sawblade area would be sufficient to extract much of the energy stored in the blade. However, the saw blade has many modes of vibration involving nodes (locations of vanishingly small motion) and antinodes (locations of maximum vibrational amplitude) over its entire surface. Wherever one may extract large amounts of energy the blade may be made to become substantially vibrationless, but other areas of the saw may still vibrate at large amplitudes. Such a damper, located only over a small area, acts as a constraint and in effect changes the vibrational pattern by creating a new or "virtual" nodal region from which further energy cannot be extracted by this means.

What is needed is a damper that extracts energy over a large area of the saw blade so that it effectively draws energy from all possible actively vibrating areas, which is to say from all active modes at least for a portion of the time during each rotation of the saw blade.

The higher the flow resistance is made in the porous damping plate the closer the plate must be positioned to the saw blade in order that the pressures developed by the movement of the blade will be confined and not leak out around the edges. Even if the edges were effectively sealed in some way against leakage, the porous damping plate must be close to the saw in order that the movement of the saw will cause a like movement of air back and forth through the porous material with a minimum of reduction in that motion due to the expansion and contraction of the air in the space between the blade and the porous plate.

To maximize the effectiveness of this type of damping means, dampers may be used symmetrically on both sides of the blade. It is not necessary to exert much pressure against the blade but it is necessary to keep the porous surfaces in close proximity to the saw and therefore if a damper is used on only one side, the gross vibrations that may be caused by saw misalignment or by rotational vibrations that may have amplitudes of several thousandths of an inch, will cause the average separation to be so great that the damper may lose much of its effectiveness as regards damping of acoustic vibrations.

In order to attain a close relation between the flat surface of the porous damping plate and the saw blade without touching, and to permit constant adaptation of the damper position so as to accomodate any low frequency vibrations or irregularities of the position of the saw blade as it rotates or to the even greater irregularities that may result through inadvertant twisting of the work piece and to automatically accomodate changes in thickness from one sawblade to the next, it is a feature of this invention to support the damping plate on an air film acting as a static air bearing for which the air may be supplied partially through one porous material and partially through a plurality of small holes provided for that purpose, arranged to conduct pressurized air from a closed cavity behind the porous plate and to suitably distribute it in the space between the porous plate and the saw blade.

In order that the damping plate not rest against the saw when it is stopped, which would permit wear and possible damage if the saw are inadvertantly started with the damper plate in contact before air pressure is supplied, it is another feature of the present invention to employ a spring system to draw the damper away from the saw when the air pressure falls below a safe supporting value. The force necessary to press the damper against the saw is supplied by the same air pressure source through the action of a suitably sized bellows or pneumatic cylinder. Thereby the mechanism is a fail-safe device; the damper can approach the saw only when the air pressure is available. The pressure source can be activated by the saw switch then the damper will be retracted and the blade will be free and accessible for servicing or changing whenever the saw is stopped.

It has been found that a low pressure such as generated by a vacuum cleaner exhaust or a small blower providing as little as $\frac{1}{2}$ psig is adequate to hold the damper in position firmly against a saw blade and the air bleeding through the porous metal and out between the damper and the saw keeps the region between the damper and the saw free from sawdust while sawing wood. Higher pressures may be used to attain closer proximity; higher damping will result through both the closer spacing and through the higher density of the air between the saw and the damping plate.

It must be recognized that the vibrational motion of a saw blade (as well as other vibrating mechanisms) is made up of two parts: the resonant vibration and the driven vibration. Often vibrational damping is used to reduce resonant vibrations and the driven vibration is neglected because it is generally much lower in magnitude and much more difficult to control. Therefore, damping is most often used to bring the amplitude of the resonant vibrations down near the level of the driven vibration and further reduction is considered unfeasible or uneconomical.

The present invention is designed to control noise radiated from resonant vibrations and to permit the further significant reduction of noise radiation due to driven vibration.

The difference between resonant and driven vibrations can be appreciated by impacting a sawblade with a hammer or the like and listening to the sustained ringing which may be heard to continue for many seconds. The perceived pitch gradually lowers because the original vibration was rich in modes having many frequencies of vibration from the lowest natural resonance frequency of the blade to the highest harmonics (actually overtones since they are not harmonically related frequencies, but the word harmonics is commonly used to describe these higher frequencies excited by the impact. The sharper the impact and the harder the materials are that are involved in the impact, the higher will be the upper limit of the harmonics (or overtones). The higher overtones are damped out more rapidly so the fundamental and low overtones last longer, giving the final tone a subjectively lower pitch.

Pressing lightly against the saw blade at any one point rapidly reduces the amplitude of many overtones, but will invariably leave some to continue almost as if the blade had been touched. Touching a second point simultaneously will rapidly eliminate more overtones, but will generally still leave many to continue. Clearly, any effective damper must cover much of the area in order to damp all modes.

This type of damping extracts energy that is already in the blade, stored as circulating energy gained from the initial impact.

If the blade were continually and rapidly impacted, there would be continually a new supply of energy to be dissipated. The damping supplied by a few fingers touching the blade would decrease the stored energy between impacts, but would do little to reduce the initial motion created by each hammer impact. In order to reduce the vibration caused by the impact, it is necessary to divert and dissipate a substantial fraction of the energy supplied by the impacting means before vibration is established.

Whereas a small amount of damping is highly effective in reducing the amplitude of a resonant vibration, large amounts of damping are needed to make any appreciable effect on the driven vibration.

The reason is that, if the damping takes out only a small amount of energy during each cycle (say even as little as 1%), the remaining energy can be reduced by approximately 1 dB in 10 cycles. Therefore a resonance at 1000 Hz can be reduced nearly 100 dB per second which is very dramatic. This is especially dramatic when, for example, a saw blade is highly resonant and is driven into resonant vibration by the very small forces resulting from its interaction with turbulence in the air. The resonant vibration amplitude may build up 20 dB or more over a period of several seconds. A small amount of damping can then cause a decrease of 20 dB by absorbing vibrational energy at a rate exceeding the rate at which energy is supplied from the air. When the saw is driven by tooth impact against the working material, large amounts of vibrational energy over a wide spectrum of frequencies are imparted to the blade with every impact. Resonant frequencies are highly excited. Saw blade material may be, in some instances, driven to such extreme vibrational amplitudes that the metal enters its non-linear stress region; this occasions both a beneficial increase in internal damping, which tends to limit the vibrational amplitude, and a detrimental distortion, fatigue, and possible fracture of the blade material.

A small amount of damping can again limit the excessive vibration of the resonant modes to advantage, and substantially eliminate the danger of distortion, fatigue, and failure, but to control the radiated noise to the low values required for safety of the operator and other exposed personnel, the damping means must be effective against the driven vibrations, as well.

Improved saw design to reduce the forces occasioned by cutting is an important noise control measure, but for some types of cutting, this approach seems to have reached the limit of present technology. The use of damping to absorb a significant fraction of the energy imparted to the blade as the teeth cut the work is essential for reducing noise to safe values. Ordinary damping techniques are incapable of such large damping.

For effective damping of resonant modes, the vibrational energy can be extracted through a small portion of the blade area, and many decibels of noise reduction can be attained provided the damped portion includes some active parts of all significant resonant vibrational modes.

In order to obtain any significant reduction of the driven vibration, a significant fraction of the driving energy supplied must be extracted as it is supplied. The amount of reduction will be directly related to the amount of area covered by the damping device. The amount of energy extracted will be roughly proportional to the amount of area covered, and the amount of noise radiated by the residual vibration, whatever value that vibration may finally have, will be reduced by the ratio of the remaining uncovered area to the total radiating area of the untreated blade.

In order to obtain accurate alignment between the flat surface of the damper and the blade, the present invention employs a ball-and-socket joint located near the center of gravity of the damper assembly, and the damper is shaped so that the center of the socket lies on the line that is perpendicular to flat area, or "footprint", of the damper adjacent to the saw, and that passes through the effective center of this area so that a force applied through the ball-and-socket joint will provide a well balanced pressure against the saw over the whole area of the damper.

The allowable spacing is dependent upon the amount of resistance selected for the porous material and the amount of damping desired. For a very high resistance material, a very small spacing of the order of one thousandth of an inch or less is necessary for best results; the damping secured drops rapidly with distance. For lower resistance values, the spacing may be increased; the maximum damping will be less, but the decrease in damping with increased spacing will be more gradual, and where, for some reason, a relatively large spacing must be employed, a lower resistance should be used; a lower maximum damping must be accepted, but a greater tolerance for surface irregularities will be gained.

Conversely, if the surface to be damped is very smooth and flat, a very high resistance can be used to advantage. In fact, for a smooth surface such as a saw blade, the damping surface can be made non-porous. Energy is then extracted from the air between the blade and the damping plate in a number of ways:

(1) Air trapped between the blade and the non-porous damping plate is compressed in some areas and expanded in others, creating large tangential pressure gradients that cause high speed movement of the air (approaching the speed of sound) in the narrow passage between the saw and the damper. This air movement causes dissipation of vibrational energy as heat by viscous drag in exactly the same way as the movement of air through the interstices of the porous plate that was originally considered.

(2) When the spacing is small between the saw blade and the damper, a very small movement of the saw blade creates large pressure changes (for example, if the spacing is 0.001 inch and the amplitude of the saw blade movement is only the order of 0.0001, then the pressure fluctuations may exceed 1/10 of an atmosphere or 1.5 psi, which is equivalent to a sound pressure level of the order of 170 dB re 0.0002 microbar) which in turn results in significant temperature fluctuations; the closeness of the two solid surfaces tends to draw heat from the air as the temperature rises and to give heat back as the temperature drops, but, because of the time lag in the thermal transfer, the vibrational motion of the saw blade is attenuated and its energy is converted into heat in the solid surfaces.

(3) Fluctuating pressures created in the space between the saw and the damping plate tends to move the plate against the restraint of its supports and energy is extracted through the internal damping in the supporting members and through friction at its various connections. Even though they appear to be quite tight, mechanical connections yield slightly under alternating forces and convert part of the applied vibrational energy into heat, as is well known in the aircraft industry where the damping provided by riveted joints has been studied and used extensively.

For the "solid" damping plate to work as described, it must be large enough in area to cover several nodes and antinodes of the vibrating surface so as to cause the maximum values of pressure gradient.

Energy can also be extracted by allowing the damping plate to bend and by constructing the damping plate itself of a material with high internal damping. This means of transferring vibrational energy from the blade to the damping material avoids the problem of centrifugal deformation which accompanies all attempts to utilize a viscoelastic damping material that is physically bonded to the saw blade itself.

Energy can be extracted, furthermore, by using a rigid damping plate that in turn is backed by a viscoelastic damping material that deforms as the damping plate is moved under the influence of forces developed between the rigid damping plate and the saw blade.

Energy can be extracted also by a rigid damping plate containing a cavity filled with a liquid of suitable viscosity, and holding resiliently near its center a porous, massive plate, such as a plate of fiberous metal, that acts as a seismic mass tending to remain motionless as the damping plate itself is moved back and forth by forces developed between it and the saw blade. The porous massive plate, by moving relative to the liquid, will then cause liquid to flow through it and dissipate motional energy as heat in the process. The advantage of this arrangement is that the porous material is totally confined and protected against damage by any inadvertent contact with the saw blade or other foreign matter that could alter its acoustical resistance.

Figure 16:
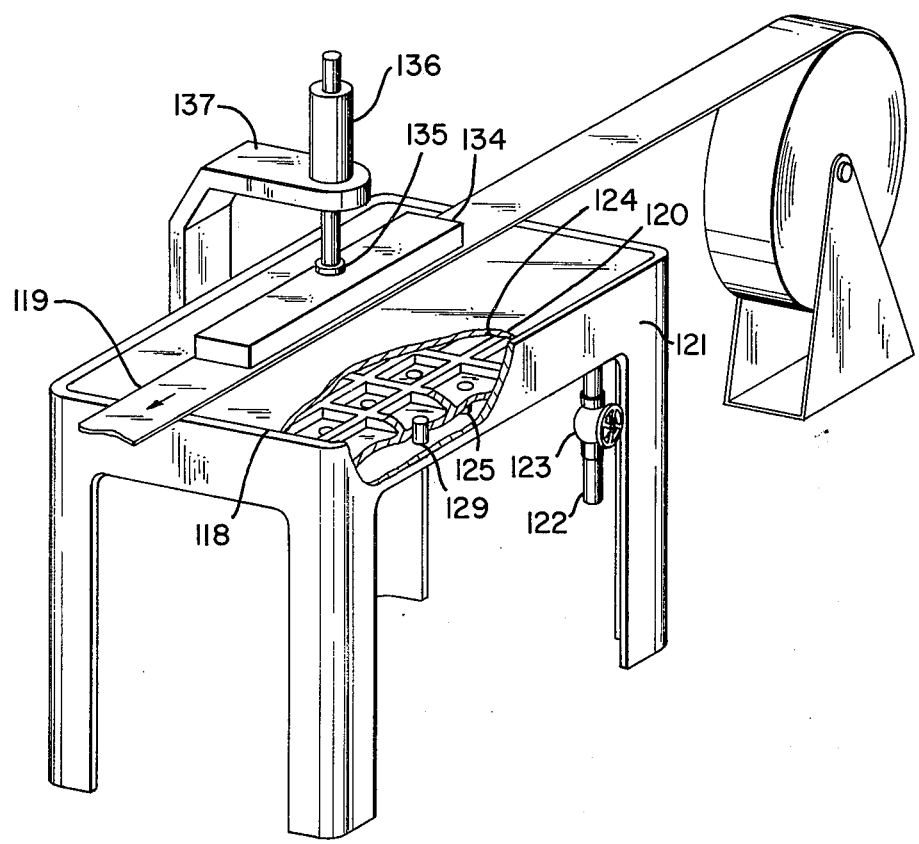
FIG. 16 shows a partially cut away perspective view of a stock table embodying dampers of the invention.
Figure 17:
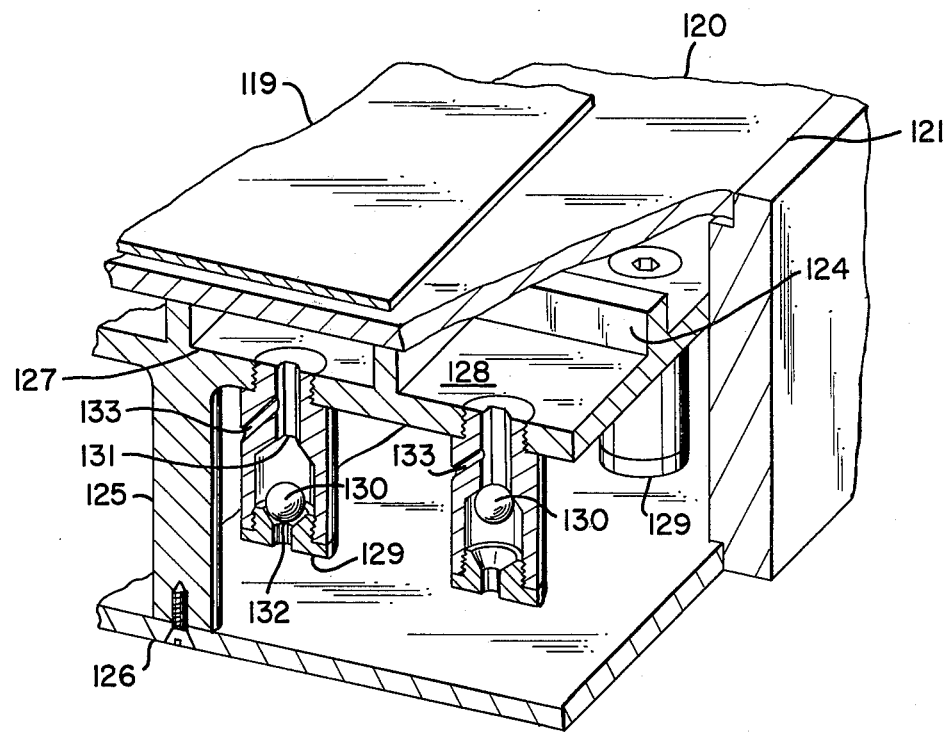
FIG. 17 shows a detail of the damper of FIG. 16.

FIG. 16 (and FIG. 17 in detail) shows an embodiment of the invention incorporated into a stock table 118 over which may pass stock 119 of various materials and various widths, undergoing operations that cause unwanted vibration. Since the stock may not completely cover the stock table, there is shown means for minimizing waste of air at areas not covered by stock.

Stock table 118 is shown, with a flat, rigid, porous bearing plate 120 secured and sealed to table sides 121. Pressurized air is provided by pipe 122 through valve 123 to the table. The interior chamber of the table, to which the air is supplied, includes a stiffening grid work 124 bonded to the underside of bearing plate 120, and additional supporting posts 125 joining to a bottom plate 126 also secured and sealed to table sides 121.

Supporting posts 125 join with a backing plate 127 from which grid work 124 rises, so that bearing plate 120, the grid work 124, the table sides 121, and backing plate 127 form a cellular structure, and backing plate 127, bottom plate 126 and the sides 121 form an air reservoir supplied by pipe 122.

Each cell 128 in the cellular structure described is supplied with pressurized air through a ball valve 129 with a ball 130 captive between upper seat 131 and lower seat 132. The seats lie one above the other in a vertical chamber that allows air passed into the air reservoir beneath the valve to lift the ball 130 from lower seat 132 and pass into the cell 128 and through the portion of porous plate 120 directly above.

If the stock 119 is above the porous plate portion over a cell 128 it will limit the air flow through the porous plate 120 and prevent the ball 130 from rising more than a little way from lower seat 132. If stock is not above the cell to limit air flow, the ball 130 will be carried by air pressure to upper seat 131 and securely seal off further air flow except for a small flow of air through bleed hole 133. Bleed hole 133 is designed to discharge approximately as much air as if stock were in position on the stock table over the location. If stock subsequently covers the area, the flow through bleed hole 133 will increase the pressure above ball 130, allowing it to drop from upper seat 131, and reactivating full air flow through the valve to porous plate 120.

Above stock table 118 is shown a smaller damper 134, of a design perhaps like that shown in FIG. 7, supplied by an air tube 135 movably urged by air cylinder 136, mounted on an arm 137 attached to the stock table 118. This damper provides the desirable second, opposite damper for such a use as shown here.

Figure 18:
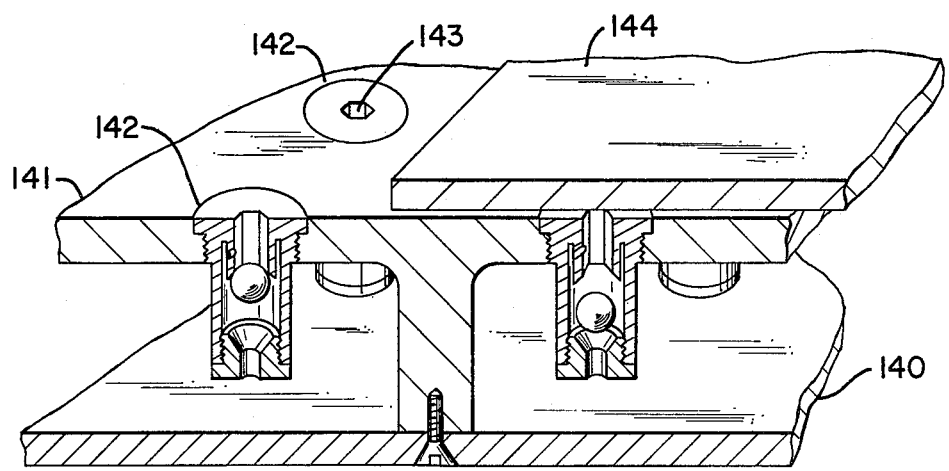
FIG. 18 shows a modification of the damper of FIG. 16, in detail.

FIG. 18 shows a detail of a variation on the way air is supplied to the area between the damper and the vibrating surface, which is illustrated in terms of a modification of the structure just described.

In FIG. 18, the pressurized air is supplied to a reservoir defined by a bottom plate 140, table sides (not shown), and a bearing plate 141. The ball valves 142 in this embodiment, however, lead to small openings 143 directly in the bearing plate 141, so that air is passed through the valves directly to the area between the bearing plate 141 and the stock 144. The operation of the valves 142 in response to the presence or absence of the stock 144 above openings 143 is the same as in that described for the detail shown in FIG. 17 for stock appearing above the appropriate cells there.

Figure 19:
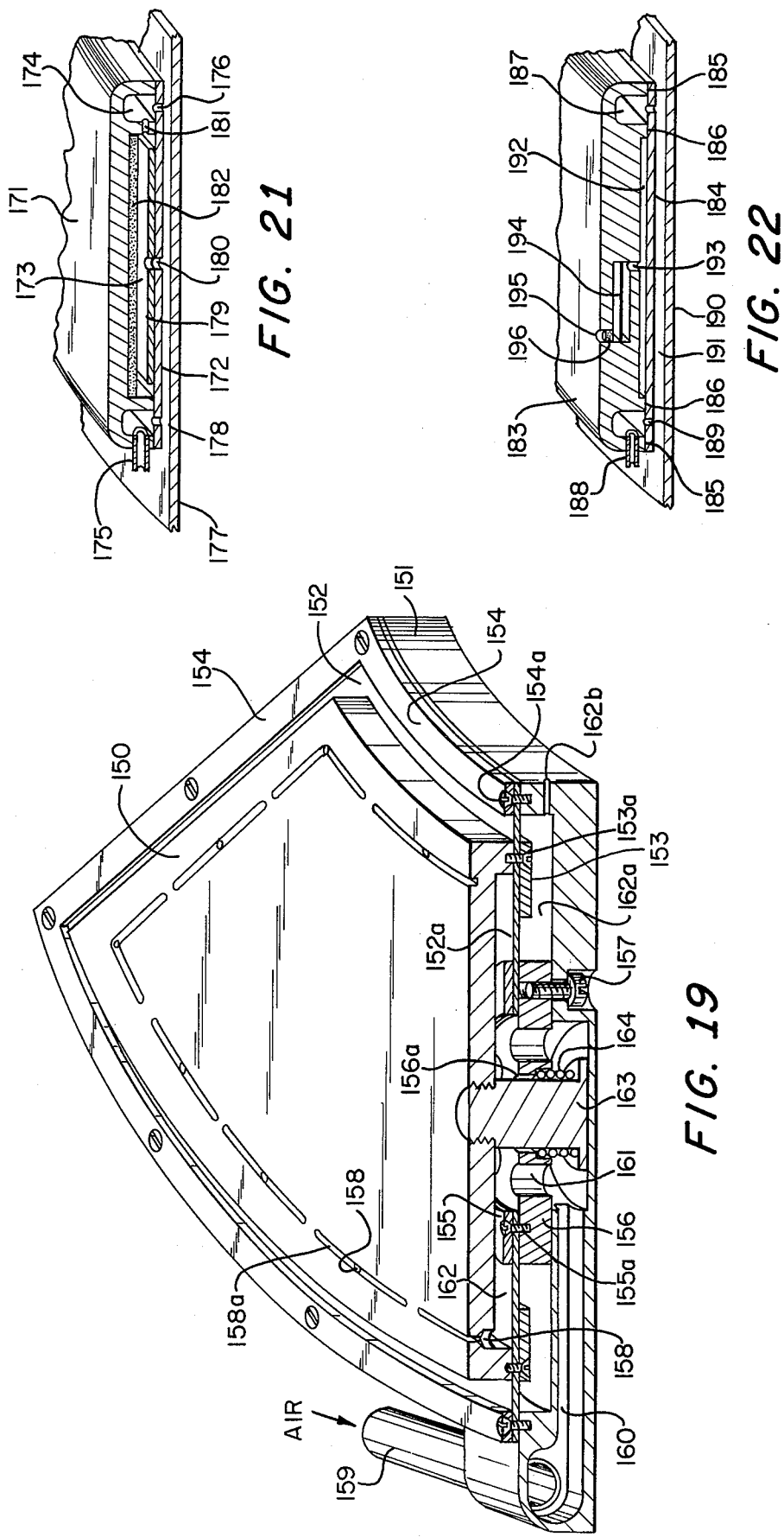
FIG. 19 shows a perspective view, with a cut away cross section, of another modification of the invention, suitable for a circular saw blade.

FIG. 19 shows another embodiment of a damper assembly intended for installation totally within a protective guard such as used on a radial arm saw. In this version, the mating member 150 is connected to a base plate 151 through a flexible diaphragm 152 (or equivalent resilient means such as a bellows) being sealed by clamping shield 153 and clamping ring 154 and being fastened by suitable means such as screws 153a and 154a. The diaphragm 152 serves to orient the mating member and aids in withdrawing it away from the saw blade when not in use. The diaphragm 152 also acts as a barrier to prevent chips and foreign material that would otherwise collect behind mating member 150 and restrict its movement.

Diaphragm 152 extends inward where its inner edge is sealed to attaching plate 156 by means clamping washer 155 and fastened by suitable means such as screws 155a. Attaching plate 156 is in turn fastened rigidly to base plate 151 by screws 157. Pressurized fluid enters the damper assembly through tube 159, through channel 160 in the base plate 151, and through holes 161 in attaching plate 156 to a chamber 162 formed by the mating member 150, the attaching plate 156, and the inward portion 152a of diaphragm 152. The diaphragm here, serves as a flexible wall of the chamber 162 allowing the mating member to move toward the saw with a thrusting force that acts through the effective center of the mating member 150 and has a value determined by the product of the chamber pressure and the effective unsupported area of the flexible wall of chamber 162 that is bounded by the inner edge of the clamping shield 153. Flexibility of the diaphragm allows the mating member to align itself accurately with the saw blade surface while fluid escaping through orifices 158 in distribution grooves 158a creates a thin fluid film that supports the mating member out of contact with the saw blade. When the number and size of the orifices have been chosen, the film thickness determines the pressure in the film as a fraction of the chamber pressure. Therefore both lifting force and the thrusting force are proportional to the chamber pressure and therefore the film thickness is set by the geometry and maintains itself substantially constant over a wide range of applied pressure, eliminating any need for critical adjustments by an operator.

To prevent excessive outward movement of the mating member and possible rupture of diaphragm 152 in the event that fluid pressure were applied when the damper assembly was not in proper relation with the saw blade, a restraining bolt 163 coacting with a withdrawal spring 164 passes through a loosely fitting guide hole 156a in the center of attaching plate 156. Bolt 163 also acts to restrain any excessive tangential movement of mating member 150 in the event that it is impacted or wedged against the saw blade by a splinter or other foreign object. Cavity 162a vents to the atmosphere through orifice 162b to maintain acceptable pressure equilization.

Figure 20:
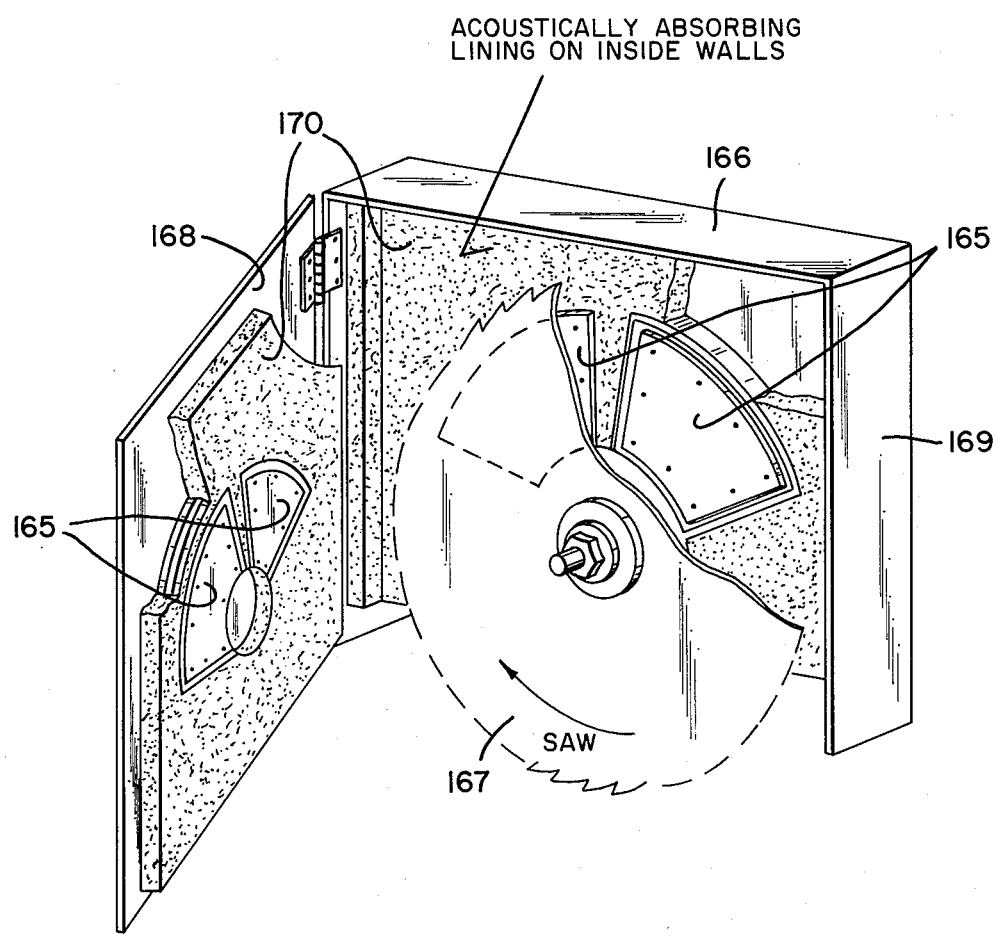
FIG. 20 shows the dampers of FIG. 19 mounted in a saw guard.

In use, the base plate 151 is positioned on the inside surface of a saw guard as illustrated in FIG. 20 and fastened securely by suitable bolts, using wedges if necessary to secure satisfactory alignment with the new blade.

FIG. 20 shows dampers 165 such as those just described on a saw guard 166 for a radial arm saw 167. Two dampers 165 are shown on the openable cover side 168 of the guard, and two others 165 on the back or stationary side 169. Acoustically absorbent lining 170 (with part removed to allow features of the dampers and saw guard to be seen) lines the interior of saw guard 166 to further enhance the noise reducing capability of the guard.

FIG. 21 shows a preferred embodiment of the damper intended for use with liquid or an air-liquid mixture as the fluid film between the mating face of the damper and the vibrating surface of a saw blade or other member to be damped. The damper comprises a rigid and massive shell 171 of generally low profile to permit its introduction between closely spaced saw blades. Attached to this shell is a mating member 172 in the form of a resilient sheet of material such as steel, that has high rigidity in the plane of the sheet, has resistance to contact wear and to abrasion from sawdust, chips or other foreign materials, and in the frequency range of 100 to 10,000 Hz, it has a bending stiffness that is significantly less than the corresponding stiffness of the saw blade.

The shell 171 is shaped so that it forms a broad chamber 173 behind the mating member and a fluid manifold 174 located to distribute fluid from an inlet tube 175 to a plurality of orifices 176 around the periphery of the damper oriented to inject fluid into the space between the mating member 172 and a vibration surface 177 to form a thin coupling flim 178. Bonded to the mating member 172 is a damping member 179 comprising one or more materials that in combination with the mating member give the desired stiffness and broad vibrational damping over the frequency range of interest. An opening 180 communicates between the coupling film and the interior of cavity 173 to provide pressure equalization and prevent excessive static deformation of the mating member. A small opening 181 from the fluid manifold 174 to the chamber 173 provides a small flow of fluid to minimize the entrances of foreign materials through the pressure equalizing opening 180 without materially affecting the pressure equalization. To provide sufficient compliance for the vibratory motion of the mating member when the chamber 173 is filled with liquid, a closed-cell, gas-filled resilient member 182 may be provided.

FIG. 22 shows another preferred embodiment of the damper intended for use with a liquid or a liquid-air mixture as the fluid film between the mating face of the damper and the vibrating surface of a saw blade or other member to be damped. The damper comprises a rigid massive shell 183 that may have even a lower profile than that of FIG. 21. Attached to this shell is a mating member 184 such as a thin sheet of steel bonded securely around the periphery of the shell in two bands 185 and 186 located on either side of a peripheral recess in the shell forming a manifold 187 that distributes fluid from an inlet tube 188 to a plurality of orifices 189 that serve to inject fluid between the mating member 184 and a saw blade 190 to form a supporting and coupling film 191.

Between most of the area of the mating member 184 and the shell 183 a small space 192 of the order of 1 mil is provided to permit vibration of the mating member as it is driven by the vibration of the vibrating member 190 through the coupling film 191. The space 192 is filled with a working fluid such as air or freon or a liquid of appropriate viscosity, to perform as a vibration damping medium, converting vibratory motion of the mating member into heat by viscous flow created in the fluid in the space 192.

To prevent excessive static pressure changes in the fluid, a vent 193 is provided to a soft diaphragm 194 that seals the working fluid in and allows pressure equalization to the atmosphere through an opening 195 containing a dust filter 196.

For some applications, such as in the sawing of metal or wet lumber, a cooling or lubricating liquid is often applied to the saw blade. In some instances, such as liquid film replacing or mixed with air between the saw blade and the damper could be used to improve the damping of the new blade vibration.

Particularly where larger saws are used, having greater stiffness and more surface irregularities, a liquid film can beneficially increase the stiffness of coupling between the saw blade and the mating face of the damper. When the film thickness and composition is within acceptable limits, the extraction of vibrational energy from the blade will be enhanced by the added liquid in the film.

In some instances the lubricating character of the liquid will even allow a reduction of the film thickness without the danger of solid contact and will thereby further increase the stiffness of coupling. In the extreme, it is possible to effect such a strong coupling that the mating face of the damping assembly and the surface of the saw blade will be substantially locked together as regards vibrational motion perpendicular to the liquid film between them, while the saw blade will still slide freely between the opposing damping members because of the lubrication provided.

If the saw blade is strongly coupled in this way and if the damping assembly is a rigid massive member, as is customary with saw guides of prior art designs, the vibration in the region of the blade in proximity with the damper will be substantially eliminated, almost as if this portion of the blade were clamped in a vise. Any vibrations in the remainder of blade will experience a sharp impedance discontinuity at the edge of the damping faces and will reflect back toward undamped regions of the saw blade with little or no energy loss. Although such an assembly will stablize the saw blade position, meeting the objective of a conventional saw guide, it will be largely ineffective in reducing the high frequency vibrations of the blade and therefore will create only a little noise reduction, as has been reported by users of the prior art.

To overcome this difficulty and to obtain noise reduction according to the teaching of the present invention, when liquid lubricants or coolants are used, the damping assembly requires a resilient facing member that will flex at acoustic frequencies between 100 and 10,000 Hertz so as to accept vibratory motion in this frequency range transmitted from the rotating saw blade through the coupling assembly. The damping assembly is then made to suitably coact with any of various known material combinations using conventional means to extract vibrational energy from the resilient facing, thereby indirectly, but effectively extracting vibrational energy from the blade and reducing its noise radiation without any solid contact with it.

There has been described novel apparatus and techniques for appreciably reducing audible sound energy from a vibrating structure. It is evident that those skilled in the art may now make numerous uses and modifications of and departures from the specific apparatus and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for damping vibrations in a vibrating surface having significant vibrational energy in the audio-frequency range above 100 Hz comprising,
   damping means for absorbing vibrational energy in the audiofrequency range above 100 Hz.
   means for supporting said damping means in close proximity to but normally slightly spaced from said vibrating surface and extending over a substantial portion of the area of said vibrating surface to embrace at least one of the highly vibrating areas of every significant mode to significantly reduce the audible sound energy radiated by said vibrating surface as compared with the audible sound energy radiated by said vibrating surface without said damping means,
   said damping means having a mating member with a mating face facing said vibrating surface,
   said mating face having cross dimensions comparable with the wavelength in the vibrating surface of at least some of the vibrational frequencies.

2. Apparatus for damping vibrations in accordance with claim 1 wherein said damping means comprises first and second damping assemblies on opposite sides of said vibrating surface 3. Apparatus for damping vibrations in accordance with claim 1 wherein said mating member comprises a porous facing having a mating surface parallel and in close proximity to said vibrating surface, but slightly spaced therefrom along substantially the entire area of said mating face.

4. Apparatus for damping vibrations in accordance with claim 1 in which said mating member comprises a solid backing coacting with said mating face to define a cavity.

5. Apparatus for damping vibrations in accordance with claim 1 wherein said mating member has a mating surface that is substantially parallel to and conforms in shape with said vibrating surface and wherein said means for supporting comprises,
   resilient means urging said mating surface toward said vibrating surface,
   a source of fluid under pressure coupled to said mating surface and comprising means for injecting said fluid between said mating surface and a corresponding area defined as the coupling area of said vibrating surface to keep the latter two surfaces normally slightly apart.

6. Apparatus for damping vibrations in accordance with claim 5 wherein said fluid passes through pores in said mating surface to the region between said mating surface and said vibrating surface.

7. Apparatus for damping vibrations in accordance with claim 5 wherein said mating surface includes a plurality of small openings about the periphery thereof for passing said fluid into the region between said vibrating surface and said damping surface.

8. Apparatus for damping audible vibrations in accordance with claim 5 wherein said resilient means comprises bellows means coupled to said source of fluid.

9. Apparatus for damping vibrations in accordance with claim 3 wherein said damping means includes internal structural means for providing supportive attachment to said porous facing at a plurality of contact positions distributed substantially uniformly thereover to reduce the unsupported spans of said porous facing for reducing undesired vibration or deformation thereof caused by pressure variations.

10. Apparatus for damping vibrations in accordance with claim 5 wherein said resilient means applies a force to said damping means by a joint means acting through the effective center of the area of pressure between said damping means and said vibrating surface for allowing said damping means to rotate a small amount about each of three orthogonal axes to allow it to align itself with said vibrating surface and to provide substantially uniform pressure against said vibrating surface while resisting rotation beyond preset limits.

11. Apparatus for damping vibrations in accordance with claim 3 wherein damping means comprises a supporting grid having a small cellular structure fastened and sealed to the side of said porous facing away from said vibratory surface so that each cell functions as a conduit for delivering pressurized fluid to the adjacent portion of the porous facing and a set of light spring reeds positioned for substantially closing any cell individually forming means for resisting excess loss of fluid when said cell may be separated from said vibrating surface, each of said spring reeds being formed with a small opening for passing fluid to said cell so that a cell once closed by a spring reed may open in response to a change in the distance between the cell and vibrating surface as that portion of said porous facing bounded by the cell again approaches within a predetermined distance from an adjacent corresponding area of said vibrating surface.

12. Apparatus for damping vibrations in accordance with claim 11 and further comprising,
   a cover plate sealing means having depending clamping columns for clamping said reeds at nodal areas of nonmovement.

13. Apparatus for damping vibrations in accordance with claim 1 wherein said vibrating surface is a rotating saw blade.

14. Apparatus for damping vibrations in accordance with claim 13 wherein said damping means extends over an area that is at least a quadrant of said rotating saw blade.

15. Apparatus for damping vibrations in accordance with claim 1 wherein said mating member has a mating surface that is substantially parallel to and conforms in shape with said vibrating surface and wherein said means for supporting comprises
   resilient means urging said mating surface away from said vibrating surface,
   a source of fluid under pressure coupled to said mating member and comprising means for injecting said fluid so that said mating surface is urged toward said vibrating surface.

16. Apparatus for damping vibrations in accordance with claim 1 wherein said mating member has a mating surface that is substantially parallel to and conforms in shape with said vibrating surface and wherein said means for supporting comprises
   resilient wall means urging said mating surface away from said vibrating surface,
   said resilient wall means helping to define a fluid reservoir,
   means for connecting fluid under pressure to said fluid reservoir so that said mating surface is urged toward said vibrating surface.

17. Apparatus for damping vibrations in accordance with claim 3 wherein said damping means comprises a supporting grid having a small cellular structure fastened and sealed to the side of said porous facing away from said vibratory surface so that each cell functions as a conduit for delivering pressurized fluid to the adjacent portion of the porous facing, and ball valve means controlling the flow of fluid to each said cell for substantially closing any cell individually, forming means for resisting excess loss of fluid when said cell may be separated from said vibrating surface, each said ball valve means being formed with a small opening for passing fluid to said cell so that a cell once closed by said ball valve means may open in response to a change in the distance between the cell and vibrating surface as that portion of said porous facing bounded by the cell again approaches within a predetermined distance from an adjacent corresponding area of said vibrating surface.

18. Apparatus for damping vibrations in accordance with claim 1 wherein said mating member has a mating surface that is substantially parallel to and conforms in shape with said vibrating surface and wherein a supporting grid having a small cellular structure is fastened and sealed to the side of said mating surface away from said vibrating surface, each cell so formed including means for injecting pressurized fluid between said mating surface and said vibrating surface, and means for providing pressurized fluid to each said cell,
   each said means for injecting pressurized fluid between said mating surface and said vibrating surface including ball valve means for controlling the flow of fluid through each said injecting means for substantially closing any injecting means individually, forming means for resisting excess loss of fluid when said cell may be separated from said vibrating surface, each said ball valve means being formed with a small opening for passing fluid past said injecting means so that an injecting means once closed by said ball valve means may open in response to a change in the distance between the cell and vibrating surface as that portion of said mating surface bounded by the cell again approaches within a predetermined distance from an adjacent corresponding area of said vibrating surface.

19. Apparatus for damping vibrations in accordance with claim 5 wherein said mating member comprises a solid backing coacting with said mating face to define a cavity,
   said mating face comprising a resilient wear plate that is highly inextensible in a direction parallel to the mating face surface and has a bending stiffness substantially less than that of said vibrating surface in a direction perpendicular to said mating face surface.

20. Apparatus for damping vibrations in accordance with claim 19 wherein said fluid between said mating surface and said coupling area to keep said mating and vibrating surfaces normally slightly apart, comprises a coupling means joining said two surfaces vibrationally so as to cause said mating face to vibrate in a direction perpendicular to said mating face surface in response to vibrations in the coupling area of said vibrating surface.

21. Apparatus for damping vibrations in accordance with claim 20 wherein said mating member comprises a viscoelastic member coacting with said resilient mating face to damp vibration transmitted to said mating face from said vibrating surface through said coupling means.

22. Apparatus for damping vibrations in accordance with claim 20 and further comprising a flow restricting orifice intercoupling said cavity with said source of fluid under pressure to supply a small, steady flow of fluid to said cavity,
   and a small opening coupling said cavity to said fluid film allowing the outward flow of fluid into the fluid film thereby maintaining the steady pressure within said cavity slightly higher than that in said film.

23. Apparatus for damping vibrations in accordance with claim 20 wherein said cavity comprises a thin space of the order of 1 to 10 mils thick parallel with and extending over substantially the entire back surface of said mating face,
   and further comprising an opening containing a dust filter venting said cavity to atmospheric pressure.

24. Apparatus for damping vibrations in accordance with claim 23 and further comprising a fluid filling said cavity,
   and means defining a venting path that is sealed with a soft impervious diaphragm and protected from outside contamination by a dust filter for maintaining said fluid at substantially atmospheric pressure.
   said fluid in said cavity coacting with said solid backing and said mating face to absorb vibrational energy from said mating face.

25. Apparatus for damping vibrations in accordance with claim 1 and further comprising a source of fluid under pressure coupled to said mating surface and comprising means for injecting said fluid between said mating surface and a corresponding area defined as the coupling area of said vibrating surface to keep the latter two surfaces normally slightly apart, said mating member comprising a solid backing coacting with said mating face and a flexible wall member to form a cavity, said mating member comprising also means communicating with said source of fluid under pressure to pressurize said cavity so as to deform said flexible wall member and force said mating face to move toward said vibrating surface.

26. Apparatus for damping vibrations in accordance with claim 25 and further comprising a saw guard, and means for mounting said apparatus of claim 25 inside said saw guard.

27. Apparatus for damping vibrations in a vibrating surface in accordance with claim 1 wherein said vibrating surface comprises a moving saw blade.

28. Apparatus for damping vibrations in accordance with claim 5 wherein said mating surface includes a plurality of small openings for passing said fluid into the region between said vibrating surface and said damping surface and means defining a groove contiguous with a respective small opening through which fluid passes from a respective opening into the region between said vibrating surface and said damping surface while comprising means for isolating each of said small openings from the others.

29. Apparatus for damping vibrations in a vibrating surface in accordance with claim 1 wherein said vibrating surface comprises a nonmetallic sheet.

30. Apparatus for damping vibrations in a vibrating surface in accordance with claim 1 wherein said vibrating surface comprises extruded material.

31. Apparatus for damping vibrations in a vibrating surface in accordance with claim 1 wherein said vibrating surface comprises material being sawed.

* * * * *